Oct. 8, 1963

C. E. WHITE 3,106,422

WEATHERSTRIP

Filed Aug. 19, 1960

CHARLES E. WHITE
INVENTOR.

BY John P. Faulkner
John J. Roethel

ATTORNEYS 3,106,422
WEATHERSTRIP
Charles E. White, Allen Park, Mich., assignor to Ford Motor Company, Dearborn, Mich., a corporation of Delaware
Filed Aug. 19, 1960, Ser. No. 57,097
2 Claims. (Cl. 296—93)

This invention relates to motor vehicles of the convertible type and particularly to a sealing device adapted to provide a seal between the top and windshield headers of such vehicles.

In motor vehicles utilizing convertible tops, it is desirable to provide a seal between the top and windshield headers to prevent the entrance of water, air and other foreign material into the vehicle interior. Conventionally, a strip of resilient material is fastened to the top header to serve this purpose. Ideally, the adjacent header surfaces would be completely parallel and free from any surface irregularities and thus form a positive seal. In production the cost of forming such surfaces is prohibitive and inadequate sealing results even with the use of a resilient member.

An object of this invention is to provide an improved sealing device which will provide a positive seal between the two header members and which can easily be adjusted during installation to compensate for irregularities in shape of the surfaces to be sealed.

This invention contemplates the use of a seal which incorporates an elongated retainer member formed of a material which can easily be permanently deformed. In the completed seal the retainer member has adjacent to its one side a body of resilient material. This body of resilient material extends around the retainer at one edge thereof and extends along the other side of the retainer for a portion of its width. The retainer and resilient body are secured near the other edge to one of the headers. The portion of the resilient body extending along the other side of the retainer is adjacent the other header. The retainer may be deformed or bent, as desired, to bring these surfaces into more intimate contact and thereby compensate for irregularities in the shape of the adjacent headers. To insure even greater sealing action, ribs are formed in the resilient body adjacent one of the headers, and a cavity is formed in that portion of the resilient body to allow even greater flexibility. In operation, the ribs are slightly deflected and the body is slightly compressed. In this way a positive seal is maintained between the adjacent surfaces at all times.

Other objects and advantages of this invention will be made more apparent as this description proceeds, particularly when considered in connection with the accompanying drawings, wherein.

Figure 1:
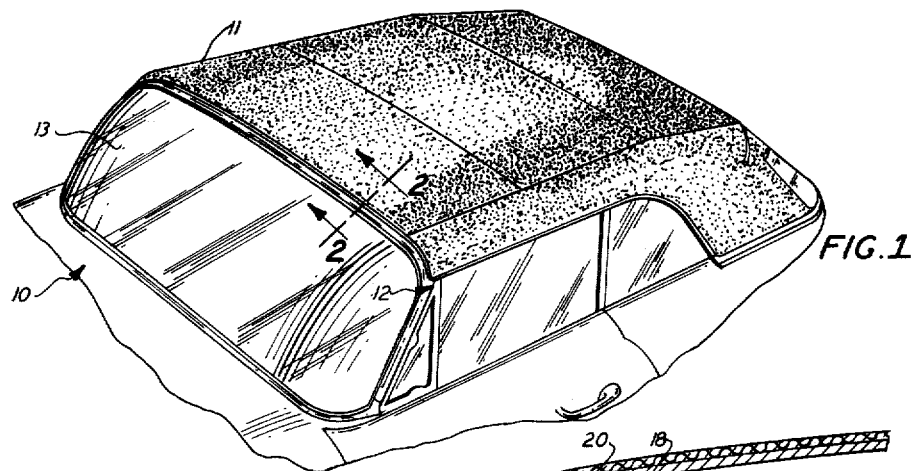
FIGURE 1 is a partial view of a vehicle incorporating this invention.

Referring now to the drawings, and in particular to FIGURE 1, a motor vehicle is shown generally at 10 which incorporates a convertable top 11 adapted to be suitably secured by means of a conventional header lock mechanism (not shown) in its closed position to the header 12 of windshield 13.

Figure 2:
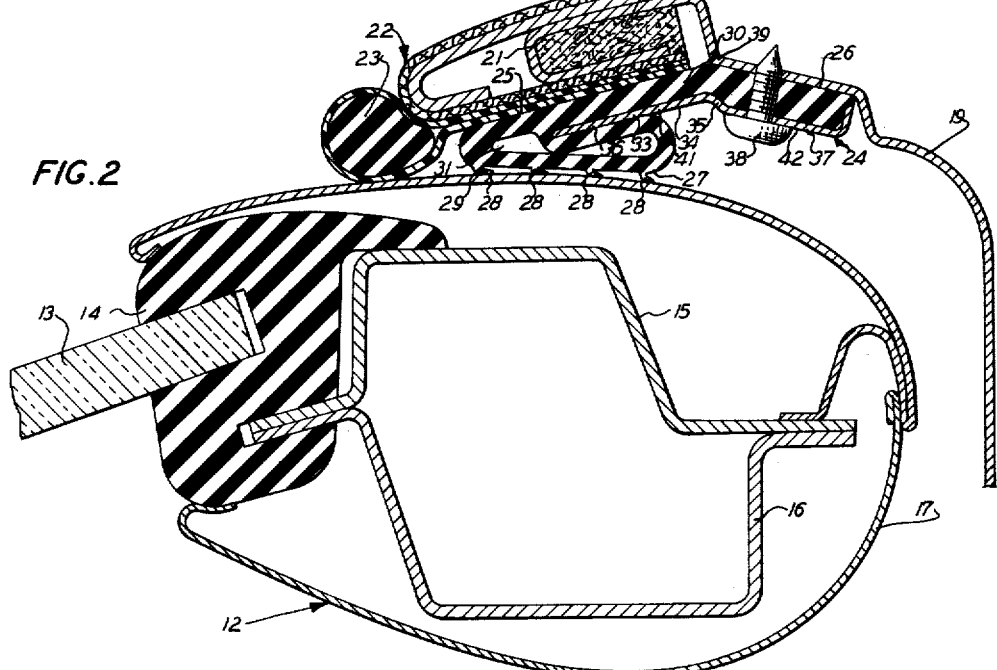
FIGURE 2 is a sectional view taken along line 2—2 of FIGURE 1.

The sealing structure to which this invention relates, may best be seen by reference to FIGURE 2. The windshield 13 is supported in the windshield header structure, generally indicated at 12 by means of rubber weatherstrip 14. The windshield header is formed of upper and lower sheet metal sections 15 and 16 which are welded or secured together in some other suitable fashion. A decorative chrome plated sheet metal enclosure 17 encircles the windshield header 12.

The top header, generally indicated at 22, is composed of upper and lower sheet metal sections 18 and 19 welded or otherwise fastened together. A body of weatherstrip material 20 is incorporated in the area 21 formed in the top header member 19. An external weatherstrip 23 is secured to the top header by screws (not shown) or by other suitable means.

Figure 3:
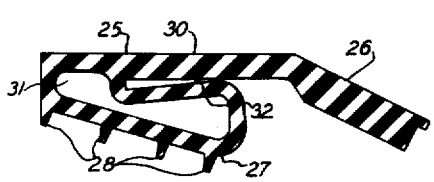
FIGURE 3 is a cross sectional view showing, in detail, the shape of the resilient body, which comprises a part of the seal in its free form.

The novel seal embodying the present invention is shown generally at 24. This seal includes a body of resilient material 30, preferably formed of extruded rubber, best shown in FIGURE 3. This body is formed with two surfaces 25 and 26 which abut the underside of the top header assembly. Surface 27 of the body is adapted to contact surface 29 of the windshield header to form a seal therewith. Surface 27 includes one or more ribs 28 to provide additional sealing action. A cavity or air space 31 is formed in the portion of body 30 which is adjacent to surface 29 of the windshield header. This air space gives body 30 greater resilience in this area to provide a more positive seal. Body 30 is also formed with a channel 32 to receive the leading edge portion 33 of an elongated retainer member 34. Retainer member 34 is a deformable strip of material, preferably sheet steel, which runs along the length of body 30 and is illustrated as being formed of two sections 41 and 42 which join each other at an obtuse angle. One side 35 of the retainer 34 is entirely contacted by the resilient body 30. Body 30 surrounds one end of the retainer and contacts a portion 36 of the other side of retainer 34. As may be seen from FIGURE 3, channel 32 in body 30 is formed with converging side walls to provide an opening of a lesser dimension than of the thickness of retainer 34. In this way, these members are held securely together when assembled. If desired, these members may be bonded together or secured by some other means in addition to the "force fit."

Seal assembly 24 is secured near one edge 37 thereof to the top header 22 by means of screws 38, only one of which is shown, or by other suitable fastening means. This insures a positive seal between member 30 and the top header structure at area 39.

Once the structure is completely assembled and the convertible top is in place, as shown in FIGURE 2, the seal along surface 29 may not be perfect due to irregularities in the shape of this surface. Once the areas of inadequate seal are found by some suitable test, the seal can easily be corrected. To accomplish this, the retainer strip is deformed in such a way that the surface 27 and the ribs 28 of the body are brought closer to surface 29. This may easily be done by lifting the top header off of the windshield header, and then bending the leading edge of the retainer strip away from the top header. One suitable way in which this can be done is by insertion of a flat blade tool between the front weatherstrip 23 and the front edge of seal assembly 24. The front or leading edge portion 33 of strip 34 may then be deformed toward the windshield header. This will, in turn, bring the seal surface 27 and ribs 28 into intimate contact with the surface 29 once the retractable top is again in its closed position. This adjustment takes place over a small area so that the seal at other points is not affected.

It can thus be seen that this invention provides for motor vehicles utilizing convertible tops a positive seal at the top and windshield header surfaces, even though these surfaces may not be perfectly formed.

It will be understood that the invention is not to be limited to the exact construction shown and described, but that various modifications may be made without departing

I claim:
1. In a vehicle body having a foldable top, a windshield header, a top header adapted to overlie said windshield header in extended position of said top, a compression type weatherstrip carried on one of said headers and compressible between said headers to effect a seal between facing surfaces thereof, said weatherstrip comprising a longitudinally extending base portion, a longitudinally extending base portion, a longitudinally extending flange portion integral with one edge of said base portion, and a compression portion integral with the other edge of said base portion and extending thereover toward said one edge, an elongated retention strip of deformable material having a base portion and an integral flange portion, said retention strip base portion being inserted between said weatherstrip base and compression portions, and fastening means projecting through said flange portions into the surface of said one header to retain said weatherstrip thereon, said weatherstrip flange portion thereby also being held in sealing engagement with the surface of said one header, said retention strip being deformable toward the facing surface of said other header to ensure intimate sealing contact of said compression portion with said other header along the length thereof.

2. In a vehicle body having a foldable top, a windshield header, a top header adapted to overlie said windshield header in extended position of said top, a compression type weatherstrip carried on said top header and compressible between said headers to effect a seal between facing surfaces thereof, said weatherstrip comprising a longitudinally extending base portion, a longitudinally extending flange portion integral with one edge of said base portion and extending at an angle thereto, and a compression portion integral with the other edge of said base portion and extending thereover toward said one edge, said compression portion having an irregularly shaped cavity extending therethrough whereby said compression portion is a tube of irregular internal configuration, an elongated retention strip of deformable material having a base portion and an integral flange portion extending at an angle thereto, the angular relationship of said retention strip base portion and its flange being complementary to the angular relationship of said weatherstrip base portion and its flange, said retention strip base portion being inserted between said weatherstrip base and compression portions, and fastening means projecting through said flange portions into the surface of said top header to retain said weatherstrip thereon, said weatherstrip flange portion thereby also being held in sealing engagement with the surface of said top header, said retention strip being deformable toward the facing surface of said windshield header to insure intimate sealing contact of said compression portion with said windshield header along the length thereof.

References Cited in the file of this patent
UNITED STATES PATENTS

| | | |
|---|---|---|
| 2,498,851 | Doty | Feb. 28, 1950 |
| 2,528,705 | Norrish | Nov. 7, 1950 |
| 2,622,286 | Beck | Dec. 23, 1952 |
| 2,687,914 | Schrum | Aug. 31, 1954 |
| 2,737,412 | Smith et al. | Mar. 6, 1956 |
| 2,774,999 | Mansmann | Dec. 25, 1956 |
| 2,817,558 | Kubacka et al. | Dec. 24, 1957 |
| 2,993,731 | Miles | July 25, 1961 |

FOREIGN PATENTS

| | | |
|---|---|---|
| 725,374 | Germany | Sept. 21, 1942 |
| 1,145,292 | France | May 6, 1957 |

UNITED STATES PATENT OFFICE
CERTIFICATE OF CORRECTION

Patent No. 3,106,422                      October 8, 1963

Charles E. White

It is hereby certified that error appears in the above numbered patent requiring correction and that the said Letters Patent should read as corrected below.

Column 3, lines 10 and 11, strike out "a longitudinally extending base portion,".

Signed and sealed this 14th day of April 1964.

(SEAL)
Attest:

ERNEST W. SWIDER
Attesting Officer

EDWARD J. BRENNER

Commissioner of Patents